US012684486B2

(12) United States Patent
    Lai et al.

(10) Patent No.: US 12,684,486 B2
(45) Date of Patent: Jul. 14, 2026

(54) SMART THERMAL THROTTLING IN MILLIMETER WAVE (MMW)

(71) Applicant: MEDIATEK INC., Hsinchu City (TW)

(72) Inventors: Chih-Chieh Lai, Hsinchu City (TW);
    Feng-Wen Weng, Hsinchu City (TW);
    Yu-Hung Huang, Hsinchu City (TW);
    Chi-Hsiang Lin, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 300 days.

(21) Appl. No.: 18/473,023

(22) Filed: Sep. 22, 2023

(65) Prior Publication Data

US 2024/0147376 A1      May 2, 2024

Related U.S. Application Data

(60) Provisional application No. 63/381,941, filed on Nov. 2, 2022.

(51) Int. Cl.
    *H04W 52/02*        (2009.01)
    *H04W 24/02*        (2009.01)
(52) U.S. Cl.
    CPC ....... *H04W 52/0245* (2013.01); *H04W 24/02* (2013.01); *H04W 52/0274* (2013.01)

(58) Field of Classification Search
    CPC ......... H04W 52/0245; H04W 52/0274; H04W 24/02
    See application file for complete search history.

(56) References Cited

U.S. PATENT DOCUMENTS

2021/0195439 A1*    6/2021   Prabhakar ......... H04W 52/0222
2021/0226681 A1*    7/2021   Raghavan ............ H04B 7/0617
2022/0302970 A1*    9/2022   Stauffer ............... H04B 7/0608

* cited by examiner

*Primary Examiner* — Jamal Javaid
(74) *Attorney, Agent, or Firm* — Helen Mao; Imperium Patent Works

(57)            ABSTRACT

Apparatus and methods are provided for thermal throttling for UE configured with multi-panel transceiving on FR2. In one novel aspect, the UE prioritizes throttling actions based on signal qualities of each transceiving panel. In one embodiment, the switching to the target panel from the active panel is selected as the highest priority throttling action when the signal quality of the target panel is similar to the active panel. In another embodiment, the UE further determines if the quality of the target panel is sufficient to support mmW transceiving before switching to the target panel. In one embodiment, the UE reduces one or more antennae of an active panel when the signal quality difference between the active panel and the target panel is bigger than a predefined gap threshold.

14 Claims, 5 Drawing Sheets

PERFORMING, BY THE UE, MILLIMETER WAVE (MMW) TRANSCEIVING ON FREQUENCY RANGE-2 (FR2) IN A WIRELESS NETWORK, WHEREIN THE UE IS CONFIGURED WITH A PLURALITY OF MMW TRANSCEIVING PANELS INCLUDING AT LEAST ONE ACTIVE PANEL AND ONE OR MORE NON-ACTIVE PANELS, AND WHEREIN EACH MMW TRANSCEIVING PANEL IS CONFIGURED WITH A PLURALITY OF ANTENNAE ~601

MONITORING ONE OR MORE TEMPERATURE TRIGGERS PRECONFIGURED BY THE UE, WHEREIN EACH OF THE TEMPERATURE TRIGGER INDICATES ONE OR MORE THROTTLING ACTIONS TO RELAX RISING UE TEMPERATURE OR TO DECREASE THE UE TEMPERATURE ~602

DETERMINING SIGNALING QUALITIES OF EACH MMW TRANSCEIVING PANELS FOR THROTTLING ACTION SELECTION UPON DETECTING ONE OR MORE TEMPERATURE TRIGGERS ~603

PERFORMING AT LEAST ONE THROTTLING ACTION BASED ON THE DETERMINED SIGNAL QUALITIES ~604

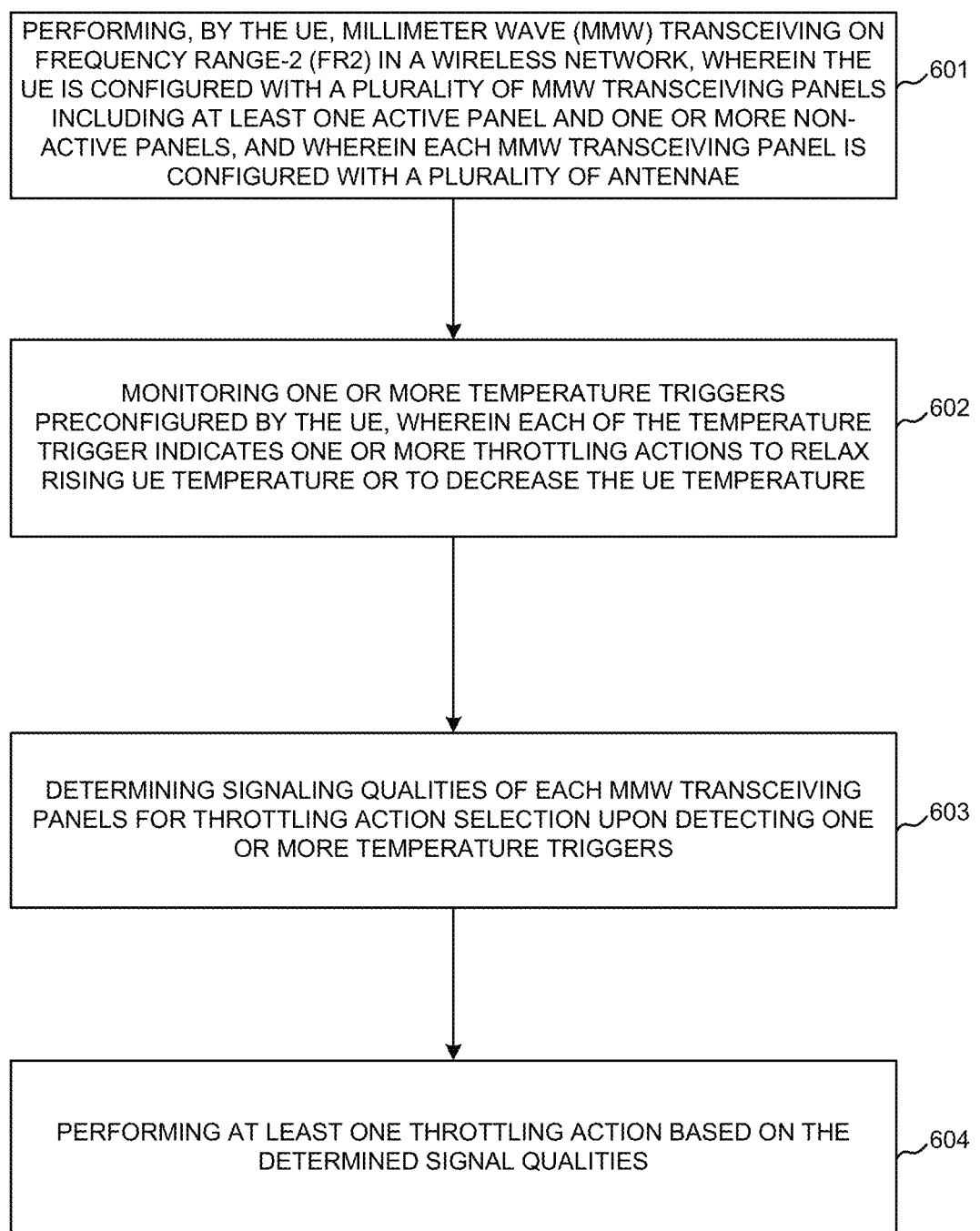

PERFORMING, BY THE UE, MILLIMETER WAVE (MMW) TRANSCEIVING ON FREQUENCY RANGE-2 (FR2) IN A WIRELESS NETWORK, WHEREIN THE UE IS CONFIGURED WITH A PLURALITY OF MMW TRANSCEIVING PANELS INCLUDING AT LEAST ONE ACTIVE PANEL AND ONE OR MORE NON-ACTIVE PANELS, AND WHEREIN EACH MMW TRANSCEIVING PANEL IS CONFIGURED WITH A PLURALITY OF ANTENNAE ⌐601

MONITORING ONE OR MORE TEMPERATURE TRIGGERS PRECONFIGURED BY THE UE, WHEREIN EACH OF THE TEMPERATURE TRIGGER INDICATES ONE OR MORE THROTTLING ACTIONS TO RELAX RISING UE TEMPERATURE OR TO DECREASE THE UE TEMPERATURE ⌐602

DETERMINING SIGNALING QUALITIES OF EACH MMW TRANSCEIVING PANELS FOR THROTTLING ACTION SELECTION UPON DETECTING ONE OR MORE TEMPERATURE TRIGGERS ⌐603

PERFORMING AT LEAST ONE THROTTLING ACTION BASED ON THE DETERMINED SIGNAL QUALITIES ⌐604

FIG. 6

SMART THERMAL THROTTLING IN MILLIMETER WAVE (MMW)

CROSS REFERENCE TO RELATED APPLICATIONS

This application claims priority under 35 U.S.C. § 119 from U.S. Provisional Application No. 63/381,941 entitled "SMART THERMAL THROTTLING IN MMW," filed on Nov. 2, 2022. The disclosure of each of the foregoing documents is incorporated herein by reference.

TECHNICAL FIELD

The disclosed embodiments relate generally to wireless communication, and, more particularly, to smart thermal throttling in millimeter wave (mmW).

BACKGROUND 5G radio access technology will be a key component of the modern access network. It will address high traffic growth and increasing demand for high-bandwidth connectivity. Advanced antenna developments make an advancement in end-user deployment in the 4G, 5G and future mobile networks. Further, end-user performance requirements continue to increase, putting high demands on the network to deliver increased coverage, capacity, and end-user throughput. The advanced antenna array in the user equipment (UE) enables state of the art beamforming and multiple input multiple output (MIMO) techniques that are powerful tools for improving end-user experience, capacity, and coverage. The antenna array in the UE significantly enhances network performance in both uplink and downlink. The wide adoption of the antenna array technology is made feasible by the technology advances in the integration of baseband, radio, and antenna, and a reduction in the digital processing cost of advanced beamforming and MIMO. One of the problems facing the multi-panel UE is overheating when conducting signal transmission or reception in mmW. As the multi-panel UE transceiving in the mmW is sensitive to the selection of the panels and antennae, the traditional way of handling thermal throttling fails to consider the characteristics of the mmW transceiving, especially in FR2 transceiving.

Improvements and enhancements are required for thermal throttling for UE equipped with multi-panel.

SUMMARY

Apparatus and methods are provided for thermal throttling for UE configured with multi-panel transceiving on FR2. In one novel aspect, the UE prioritizes throttling actions based on signal qualities of each transceiving panel. In one embodiment, the switching to the target panel from the active panel is selected as the highest priority throttling action when the signal quality of the target panel is similar to the active panel. In another embodiment, the UE further determines if the quality of the target panel is sufficient to support mmW transceiving before switching to the target panel. In one embodiment, the UE performs mmW transceiving on FR2 with at least one active panel and one or more non-active panel configured, monitors one or more temperature triggers preconfigured by the UE, wherein each of the temperature trigger indicates one or more throttling actions to relax rising UE temperature or to decrease the UE temperature. The UE determines signaling qualities of each mmW transceiving panels for throttling action selection upon detecting one or more temperature triggers and performs at least one throttling action based on the determined signal qualities. In one embodiment, the UE performs switching to a target panel from an active panel when it is determined that a signal quality difference between the active panel and the target panel is small than or equal to a predefined gap threshold. In one embodiment, the target panel is selected from a plurality of candidate panels, and wherein a signal quality of the selected target panel is better than other candidate panels. In another embodiment, the UE abandons switching to the target panel when a signal quality of the target panel is below a predefined minimum threshold. In one embodiment, the UE reduces one or more antennae of an active panel when the signal quality difference between the active panel and the target panel is bigger than a predefined gap threshold.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 illustrates an exemplary flow chart for the UE to perform thermal throttling for multi-panel FR2 transceivers based on signal qualities in accordance with embodiments of the current invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology), 6G or other radio access technology. These radio access technologies may support various wireless communication services. These services may have different quality of service (QoS) requirements, latency requirements, connected density and reliability requirements.

Figure 1:
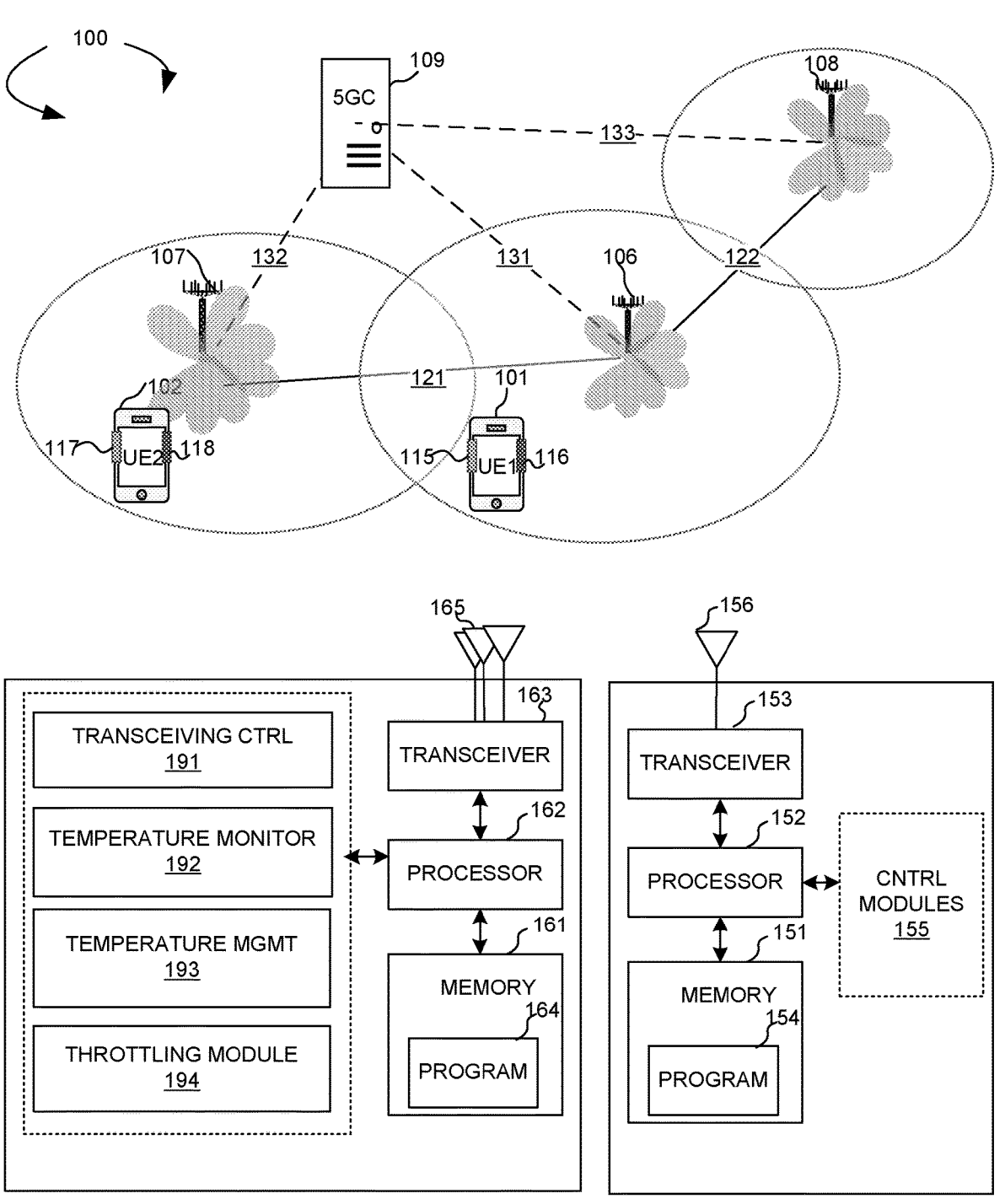
FIG. 1 is a schematic system diagram illustrating an exemplary wireless network for thermal throttling for multi-panel UE in FR2 for mmW transceiving in accordance with embodiments of the current invention.

FIG. 1 is a schematic system diagram illustrating an exemplary wireless network for thermal throttling for multi-panel UE in FR2 for mmW transceiving in accordance with embodiments of the current invention. The exemplary wireless network could be a frequency range-2 (FR2) network.

It applies to mmWave frequency range or above, e.g., T-Hz. A terminal is usually equipped with antenna array to make up for the large path loss typically in FR2 systems, and is equipped with multiple panels to deal with blocking effect for wireless propagation channels caused by rotation, hand, body, trees, or building, etc. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. Base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively.

Wireless networks 100 also include communication devices or mobile stations, such as UE1 101 and UE2 102. The mobile devices can establish one or more connections with one or more base stations. Both UE1 101 and UE2 102 are equipped with antenna array. These antenna arrays with possible different structures are arranged in different panels or heads. For example, UE1 101 has UE heads 115 and 116, and UE2 102 has UE heads 117 and 118. The UE with multiple heads/panels are configured with at least one active panel, which performs transceiving (TRX). The other panels are deactivated/non-active panels.

FIG. 1 further illustrates simplified block diagrams of a base station and a mobile device/UE for the thermal throttling. gNB 106 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations.

UE1 101 has antenna array 165, which transmits and receives radio signals. An RF transceiver circuits 163, coupled with the antenna, receives RF signals from antenna 165, converts them to baseband signals, and sends them to processor 162. In one embodiment, the RF transceiver may comprise multiple RF modules (not shown). RF transceiver 163 also converts received baseband signals from processor 162, converts them to RF signals, and sends out to antenna 165. Processor 162 processes the received baseband signals and invokes different functional modules to perform features in the UE1 101. Memory 161 stores program instructions and data 164 to control the operations of the UE1 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A transceiving controller 191 performs mmW transceiving with at least one active panel, wherein one or more non-active panels are configured. A temperature monitor module 192 monitors one or more temperature triggers preconfigured by the UE, wherein each of the temperature trigger indicates one or more throttling actions to relax rising UE temperature or to decrease the UE temperature. A temperature management module 193 determines signaling qualities of each mmW transceiving panels for throttling action selection upon detecting one or more temperature triggers. A throttling module 194 performs at least one throttling action based on the determined signal qualities.

Figures 2, 3:
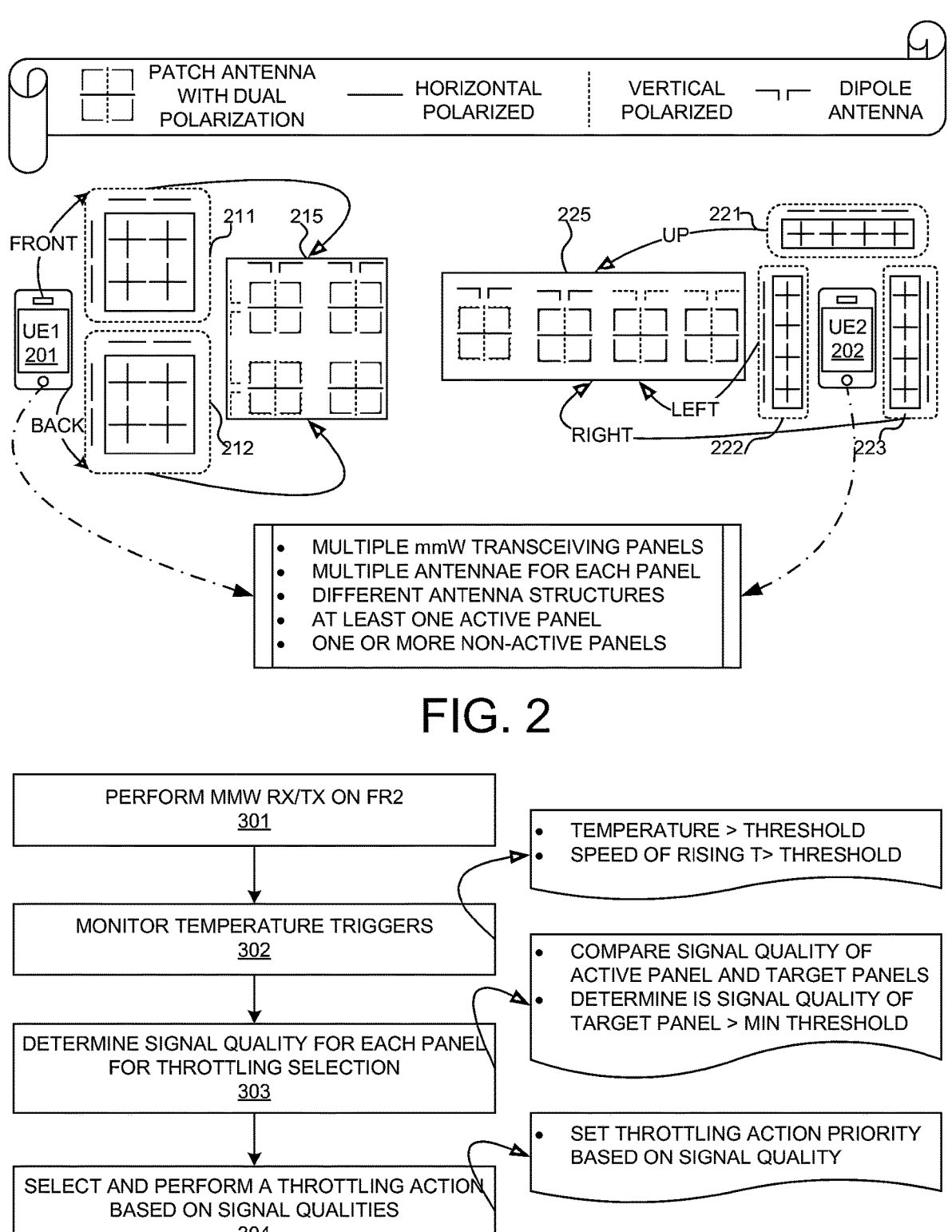
FIG. 2 illustrates diagrams of exemplary multi-panel configurations for the UE in accordance with embodiments of the current invention.
FIG. 3 illustrates an exemplary top-level diagram for the UE to perform thermal throttling for multi-panel FR2 transceivers in accordance with embodiments of the current invention.

FIG. 2 illustrates diagrams of exemplary multi-panel configurations for the UE in accordance with embodiments of the current invention. On a terminal, total panel number, panel location, panel type and antenna structure are quite different based on user scenarios. A panel can also be called 'head'. Two exemplary multi-panel configurations for UE1 201 and UE2 202 are presented. UE1 201 has two panels, a front side panel 211 and a back side panel 212. Front side panel 211 and back side panel 212 each have multiple antennae as shown in 215, including four patch antennae of dual polarization, and four dipole antennae. Each patch antenna has one horizontal polarized and one vertical polarized, 1V+1H. Each UE panel in this configuration, such UE panel 211 and 212, has twelve antennae, (4P+2D)V+(4P+2D)H, which includes four patch antennae with vertical polarization, two dipole antennae with vertical polarization; and four patch antennae with horizontal polarization, two dipole antennae with horizontal polarization. In another exemplary multi-panel configuration for UE2 202, three panels are used for UE2 202, including upside panel 221, left-side panel 222, and right-side panel 223. UE panel 221, 222, and 223 has multiple antennae as shown in 225, including four patch antennae and four dipole antennae. Panel 215 and 225 both has twelve antennae but with different arrangements. UE1 201 and UE2 202 shows exemplary configuration. The UE, when equipped with antenna array, can be configured with multiple heads/multiple panels. These UE panels can be configured with different antenna structures. In operation, at least one UE panel is the active panel, which performs transceiving radio signals. One or more UE panels are configured as non-active UE panels. Usually the terminal/UE only needs to activate one panel for TRX, and one or more other panels can be deactivated for power saving. For a FR2 terminal/UE, a proper panel is selected for TRX based on regular measurements on all panels are necessary. In general, a panel with the strongest reference signal received power/signal noise ratio (RSRP/SNR) can be selected as active panel to gain better MIMO performance.

In one novel aspect, the UE is configured with multiple mmW transceiving panels, each with multiple antennae. The mmW transceiving panels may have different antennae structures. At least one mmW transceiving panel is active and one or more non-active panels. The UE monitors one or more temperature trigger events. The UE selects and performs one or more throttling actions based on signal qualities of each of mmW transceiving panels. The UE is configured with multiple throttling actions and the UE determines a priority of the throttling actions based on the signal qualities of each of the mmW transceiving panels.

FIG. 3 illustrates an exemplary top-level diagram for the UE to perform thermal throttling for multi-panel FR2 transceivers in accordance with embodiments of the current invention. At step 301, the UE performs mmW transceiving on FR2 in a wireless network. The UE, as illustrated in FIG. 2, is configured with a plurality of mmW transceiving panels including at least one active panel and one or more non-active panels. Each mmW transceiving panel is configured with a plurality of antennae. At step 302, the UE monitors one or more temperature triggers. In one embodiment, the temperature trigger is detecting a temperature of the UE is higher than a temperature threshold. In another embodiment, the temperature trigger is a temperature rising rate being higher than a rate threshold. At step 303, the UE determines signal qualities for each panel for throttling selection. In one embodiment, signal qualities of each mmW transceiving panel is determined based on one or more measurements comprising coarse beam reference signal received power (RSRP), coarse beam signal to noise ratio (SNR), fine beam RSRP, fine beam SNR, and fine beam mutual information (MI). In one embodiment, the throttling selection is based on the signal quality difference between the active panel and the target panel. In another embodiment, the throttling selection is further based on the signal quality of the target panel. At step 304, the UE selects and performs a throttling action based on the signal qualities. In one embodiment, the UE set priorities for the plurality of throttling actions based on the signal qualities of each of the panels.

Figure 4:
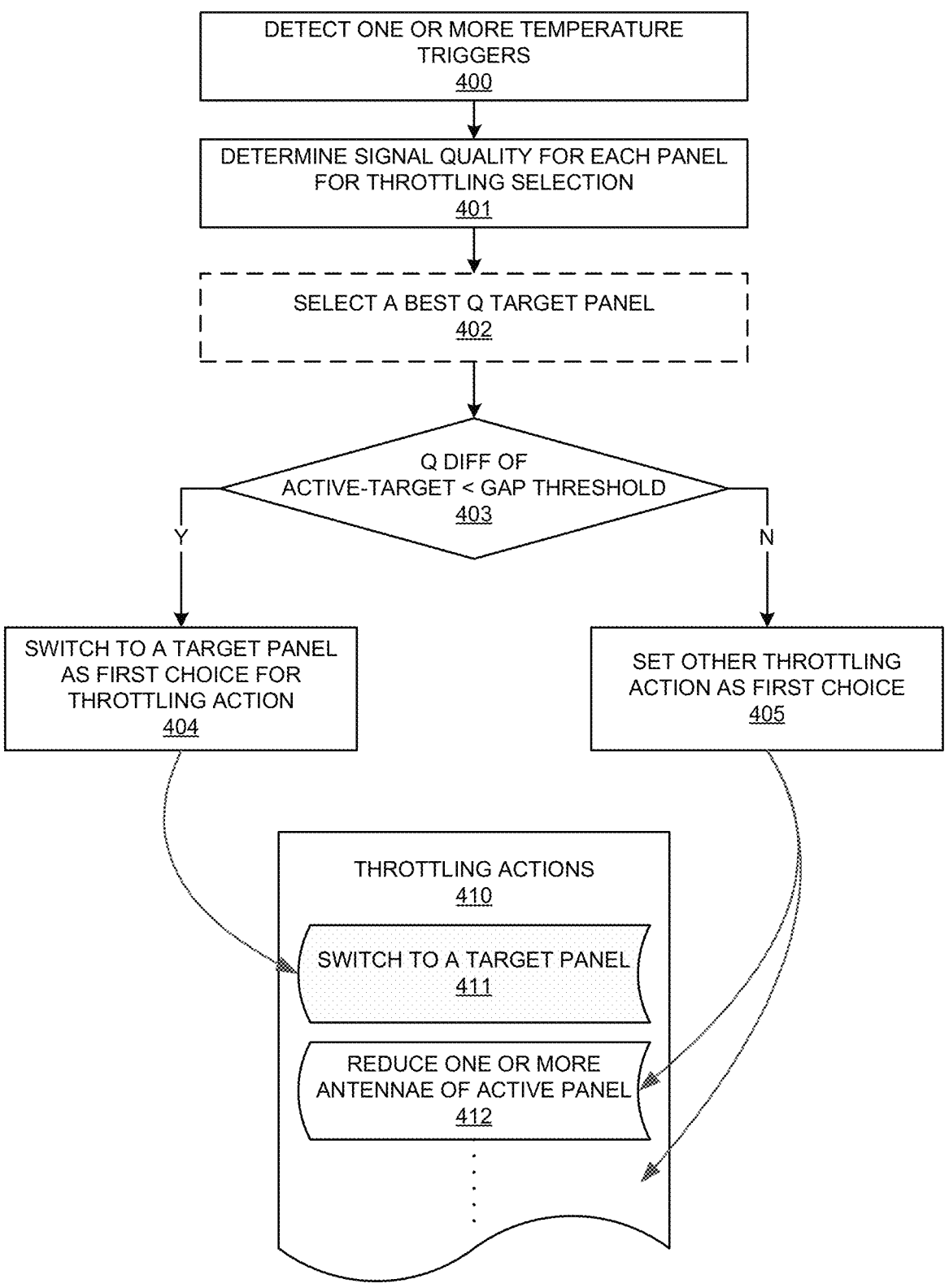
FIG. 4 illustrates an exemplary flow diagram for the UE to set priorities for the throttling actions in accordance with embodiments of the current invention.

FIG. 4 illustrates an exemplary flow diagram for the UE to set priorities for the throttling actions in accordance with embodiments of the current invention. In one novel aspect, switching to a target panel from an active panel is a highest priority option for the throttling action when a signal quality difference between the active panel and the target panel is smaller than or equal to a predefined gap threshold. At step 400, the UE detects one or more temperature triggers. At step 401, the UE determines signal qualities for each mmW transceiving panel for the throttling selection. Optionally, at step 402, the UE selects the best quality non-active panel as the target panel. At step 403, the UE determines if the quality difference between the target panel and the active panel is similar, which is if the quality difference is smaller than a predefined gap threshold. In one embodiment, the gap threshold is preconfigured or predefined.

In one embodiment, the UE is preconfigured with one or more throttling actions 410. For example, throttling actions 410 includes switching to a target panel 411 and reducing one or more antennae of the active panel 412. In one novel aspect, the UE determines a priority for one or more of the preconfigured throttling actions 410 based on the signal quality differences determined at step 403. The throttling action priority determines which action to be taken first. If the throttling action with higher priority failed, the UE selects another throttling action with a lower priority. By checking and/or comparing the signal quality of the target panel, the UE can switch to the target panel earlier to relax rising UE temperature or to decrease the UE temperature. At the same time, the UE maintains the quality of the mmW transceiving.

If step 403 determines that the signal quality between the target panel and the active panel is similar, the UE, at step 404, prepares/selects switching to the target panel as the first option/highest priority choice for the throttling action, which means, when the throttling action is triggered, the UE would first perform panel switching to relax rising UE temperature or to decrease the UE temperature. Only when the first choice/highest priority throttling action failed, the UE moves to the second priority throttling action. If step 403 determines no, the UE, at step 405, set other throttling action as the first choice. In one embodiment, the switching to the target panel action is set to the second priority choice if step 403 determines no.

Figure 5:
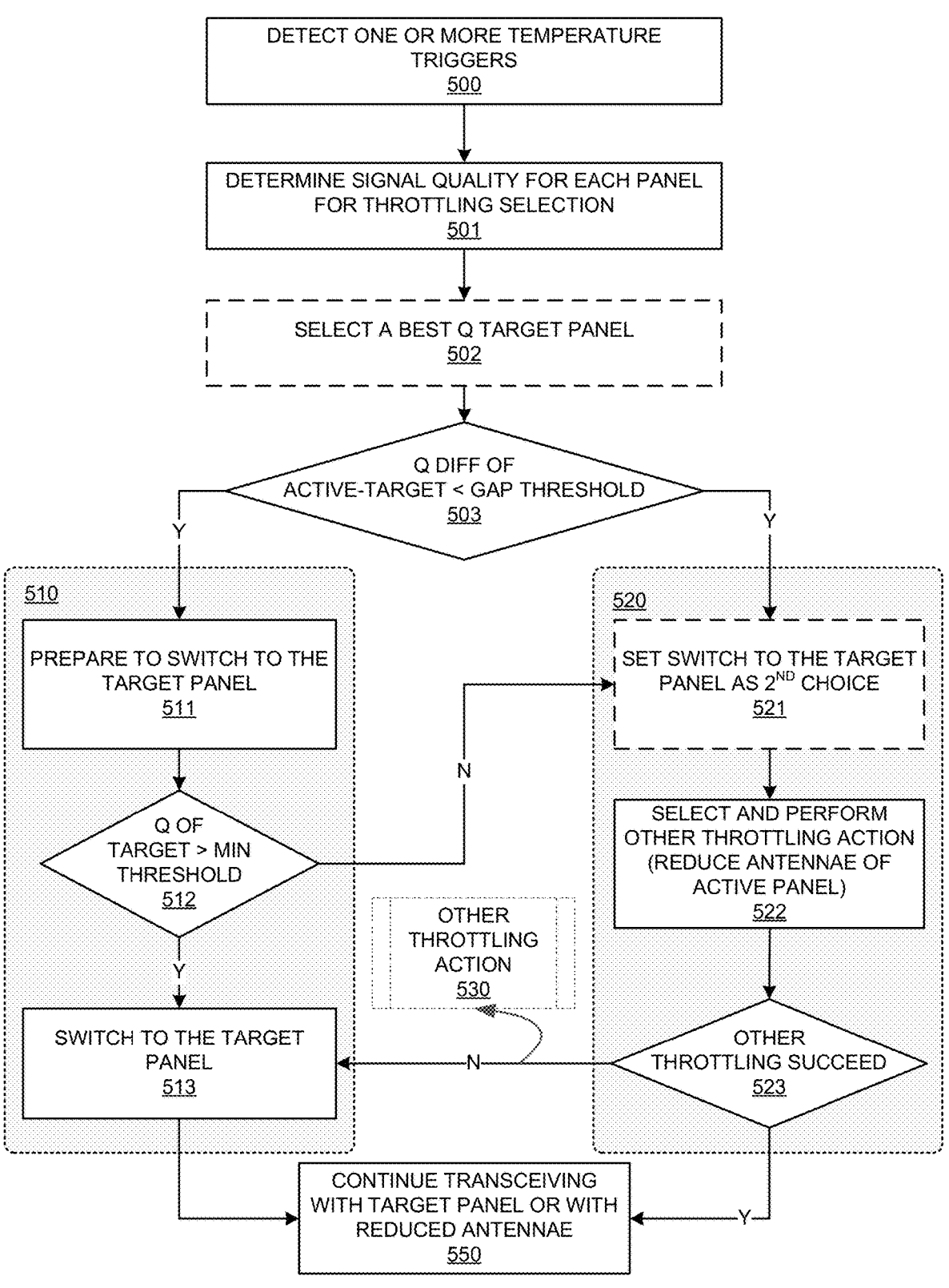
FIG. 5 illustrates an exemplary flow diagram for the UE to select and perform throttling actions based on the signal quality differences between the active panel and the target panel in accordance with embodiment of the current inventions.

FIG. 5 illustrates an exemplary flow diagram for the UE to select and perform throttling actions based on the signal quality differences between the active panel and the target panel in accordance with embodiment of the current inventions. At step 500, the UE detects one or more temperature triggers. At step 501, the UE determines signal qualities for each mmW transceiving panel for the throttling selection. Optionally, at step 502, the UE selects the best quality non-active panel as the target panel. At step 503, the UE determines if the quality difference between the target panel and the active panel is similar, which is if the quality difference is smaller than a predefined gap threshold. In one embodiment, the gap threshold is preconfigured or pre-defined. In one embodiment, the UE is preconfigured with multiple throttling actions including switching to the target panel 510, reducing antennae of the active panel 520, and other throttling actions 530.

If step 503 determines yes, the UE selects throttling action 510 by switching to target panel. At step 511, the UE prepares to switch to the target panel. At step 512, the UE further determines if the signal quality of the target panel is greater than a predefined minimum threshold. If the target panel's signal quality is below this predefined minimum threshold, the throttling action is likely to lead to radio link failure. If step 512 determines yes, the UE performs the throttling action by switching to the target pane. At step 550, the continues transceiving with the target panel.

If step 512 determines no, the UE abandons the switching to the target panel. In one embodiment, at step 521, the UE set switching to target panel as the second choice throttling action. At step 522, the UE selects other throttling actions, such as reducing the antennae for the active panel. At step 523, the UE determines if the reducing antennae is successful. If step 523 determines no, in one embodiment, the UE moves step 513 and switching to the target panel since it is set to be the second choice. In another embodiment, UE may have set other throttling actions 530 as the next choice. UE will perform the preconfigured other throttling actions. If step 523 determines yes, at step 550, the UE continues transceiving with reduced antennae.

FIG. 6 illustrates an exemplary flow chart for the UE to perform thermal throttling for multi-panel FR2 transceivers based on signal qualities in accordance with embodiments of the current invention. At step 601, the UE performs mmW transceiving on frequency range-2 (FR2) in a wireless network, wherein the UE is configured with a plurality of mmW transceiving panels including at least one active panel and one or more non-active panels, and wherein each mmW transceiving panel is configured with a plurality of antennae. At step 602, the UE monitors one or more temperature triggers preconfigured by the UE, wherein each of the temperature trigger indicates one or more throttling actions to relax rising UE temperature or to decrease the UE temperature. At step 603, the UE determines signaling qualities of each mmW transceiving panels for throttling action selection upon detecting one or more temperature triggers. At step 604, the UE performs at least one throttling action based on the determined signal qualities.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:

performing, by the UE, millimeter wave (mmW) transceiving on frequency range-2 (FR2) in a wireless network, wherein the UE is configured with a plurality of mmW transceiving panels including at least one active panel and one or more non-active panels, and wherein each mmW transceiving panel is configured with a plurality of antennae;

monitoring one or more temperature triggers preconfigured by the UE, wherein each of the temperature trigger indicates one or more throttling actions to relax rising UE temperature or to decrease the UE temperature;

determining signaling qualities of each mmW transceiving panels for throttling action selection upon detecting one or more temperature triggers; and performing at least one throttling action based on the determined signal qualities, wherein the one or more throttling actions comprise switching to a target panel from an active panel and reducing one or more antennae of an active panel, and wherein the throttling action comprises switching to a target panel from an active panel when it is determined that a signal quality difference between the active panel and the target panel is smaller than or equal to a predefined gap threshold, or wherein the throttling action comprises reducing one or more antennae of an active panel when the signal quality difference between the active panel and the target panel is bigger than a predefined gap threshold.

2. The method of claim 1, wherein the target panel is selected from a plurality of candidate panels, and wherein a signal quality of the selected target panel is better than other candidate panels.

3. The method of claim 1, wherein the UE abandons the switching to the target panel when a signal quality of the target panel is below a predefined minimum threshold.

4. The method of claim 1, wherein switching to the target panel from the active panel is a highest priority option for the throttling action when a signal quality difference between the active panel and the target panel is smaller than or equal to a predefined gap threshold.

5. The method of claim 1, wherein the one or more temperature triggers comprise a detected temperature of the UE being higher than a temperature threshold.

6. The method of claim 1, wherein the one or more temperature triggers comprise a temperature rising rate being higher than a rate threshold.

7. The method of claim 1, wherein the signal qualities of each mmW transceiving panel is determined based on one or more measurements comprising coarse beam reference signal received power (RSRP), coarse beam signal to noise ratio (SNR), fine beam RSRP, fine beam SNR, and fine beam mutual information (MI).

8. A user equipment (UE), comprising:

a plurality of millimeter wave (mmW) transceiving panels that receives radio frequency (RF) signal on frequency range-2 (FR2) in a wireless network, wherein each mmW transceiving panel is configured with a plurality of antennae;

a transceiving controller that performs mmW transceiving with at least one active panel, wherein one or more non-active panels are configured;

a temperature monitor module that monitors one or more temperature triggers preconfigured by the UE, wherein each of the temperature trigger indicates one or more throttling actions to relax rising UE temperature or to decrease the UE temperature;

a temperature management module that determines signaling qualities of each mmW transceiving panels for throttling action selection upon detecting one or more temperature triggers; and a throttling module that performs at least one throttling action based on the determined signal qualities, wherein the one or more throttling actions comprise switching to a target panel from an active panel and reducing one or more antennae of an active panel, and wherein the throttling action comprises switching to a target panel from an active panel when it is determined that a signal quality difference between the active panel and the target panel is smaller than or equal to a predefined gap threshold, or wherein the throttling action comprises reducing one or more antennae of an active panel when the signal quality difference between the active panel and the target panel is bigger than a predefined gap threshold.

9. The UE of claim 8, wherein the target panel is selected from a plurality of candidate panels, and wherein a signal quality of the selected target panel is better than other candidate panels.

10. The UE of claim 8, wherein the UE abandons the switching to the target panel when a signal quality of the target panel is below a predefined minimum threshold.

11. The UE of claim 8, wherein switching to the target panel from an active panel is a highest priority option for the throttling action when a signal quality difference between the active panel and the target panel is smaller than or equal to a predefined gap threshold.

12. The UE of claim 8, wherein the one or more temperature triggers comprise a detected temperature of the UE being higher than a temperature threshold.

13. The UE of claim 8, wherein the one or more temperature triggers comprise a temperature rising rate being higher than a rate threshold.

14. The UE of claim 8, wherein the signal qualities of each mmW transceiving panel is determined based on one or more measurements comprising coarse beam reference signal received power (RSRP), coarse beam signal to noise ratio (SNR), fine beam RSRP, fine beam SNR, and fine beam mutual information (MI).

* * * * *